(12) United States Patent  (10) Patent No.: US 8,308,941 B2
Jacobs et al.  (45) Date of Patent: Nov. 13, 2012

(54) OIL SOLUBLE ADDITIVE INJECTION APPARATUS

(75) Inventors: William A Jacobs, Lake Worth, FL (US); Brian A Jacobs, Lake Worth, FL (US); Neil Graham, Boynton Beach, FL (US)

(73) Assignee: Puradyn Filter Technologies, Inc., Boynton Beach, FL (US)

( * ) Notice: Subject to any disclaimer, the term of this patent is extended or adjusted under 35 U.S.C. 154(b) by 291 days.

(21) Appl. No.: 12/796,652

(22) Filed: Jun. 8, 2010

(65) Prior Publication Data

US 2011/0297592 A1  Dec. 8, 2011

(51) Int. Cl.
*F16N 25/02* (2006.01)
*F16N 9/04* (2006.01)
(52) U.S. Cl. ........ 210/199; 210/205; 222/57; 137/205.5
(58) Field of Classification Search .................. 210/199, 210/205, 101, 167.3; 222/57, 135, 265, 389; 137/564.5, 205, 5
See application file for complete search history.

(56) References Cited

U.S. PATENT DOCUMENTS

| 4,195,711 A | 4/1980 | Bartlett |
| 5,012,897 A | 5/1991 | Jorissen |
| 5,435,346 A * | 7/1995 | Tregidgo et al. ........... 137/564.5 |
| 7,931,817 B2 * | 4/2011 | Bilski ............................ 210/767 |
| 2009/0038888 A1 | 2/2009 | Eisenbacher |

FOREIGN PATENT DOCUMENTS

EP    0253647    1/1988

* cited by examiner

*Primary Examiner* — Terry Cecil
(74) *Attorney, Agent, or Firm* — Allen D. Hertz, P.A.; Allen D. Hertz (57) ABSTRACT

A lubricant additive dispensing apparatus comprising a base providing a manifold distribution to present lubricant to a series of dispensing chambers. The dispensing chambers are fabricated having a porous sidewall formed in a tubular shape. Additive is stored within a reservoir formed by the tubular shape. A delivery piston is provided proximate and in fluid communication with the manifold. The lubricant applies pressure to the delivery piston. The delivery piston applies pressure to the stored additive. The pressure forces a small volume of additive to pass through the porous sidewall, blending the additive with the flowing lubricant. The reservoir can be formed between an outer tubular member and an inner tubular member. Lubricant can pass through an interior of the inner tubular member, existing a flow discharge port located proximate an end cap assembled to a distal end of the reservoir.

20 Claims, 9 Drawing Sheets

OIL SOLUBLE ADDITIVE INJECTION APPARATUS

BACKGROUND OF THE INVENTION

1. Field of the Invention

The present invention relates to an oil additive injection device and method and more specifically to an oil additive injection device having a series of tubular dispensing members utilising compression to force the additive through partially-permeable membrane sidewalls of the dispensing members.

2. Discussion of the Related Art

Equipment having moving parts, such as pistons, gears, and the like, utilise lubricants to increase the longevity and reliability of the equipment. Examples of equipment utilising lubricants include internal combustion engines, hydraulic equipment, transmissions, differential gears, and the like. The lubricant is degraded by oxidation and sulfur acidification, adversely affecting equipment operation over time. For that reason, it is known to introduce additives, such as anti-oxidants, in order to extend the time between oil filter changes and/or adequately protect the equipment.

One such method of introducing the additive is to contain pellets encapsulating the additive within a dispenser. As an outer shell of the pellets dissolve, the additive is released into the lubricant. The pellets are rice-shaped, having a thickness of about 0.0625-0.125 inches and a length of about 0.3-0.7 inches, and comprises about 83-90% ethylene propylene polypropylene with a specific gravity of about 0.9 and a Shore D hardness of about 70, and about 10-17% additives comprising a combination of dispersing agent, lubricant, and detergent neutralizer. The polypropylene dissolves in above-ambient temperature oil to release the additives therefrom.

A second such method entraps the additive within a fibrous material. The fibrous material is encapsulated within a container. The lubricant passes through the fibrous material within the container. The additive is introduced to the lubricant as the fibrous material dissolves. Alternately, the pellets above are entrapped within the fibrous material, releasing the additive as the outer shell of the pellets dissolve.

A reoccurring issue plaguing the industry is the build up of sludge. The sludge congregates in nooks and crannies of the lubrication system. The filter and additive devices are prone to sludge buildup by nature of the device. The device has a high occurrence of corners and other surfaces that attract sludge. Another issue is flow resistance resulting from impingement created by the features within the filter and additive devices.

It is the primary object of the present invention to provide for the effective construction of an oil reclamation device that neutralizes sulfur acidification and oxidation. This and other objects of the invention will become clear from an inspection of a detailed description of the invention, and from the appended claims.

SUMMARY OF THE INVENTION

The present invention is directed to a lubricant additive injection system comprising a plurality of tubular additive injectors.

In a first aspect of the present invention, a lubricant additive injection system comprising:

a dispenser base assembly having a series of dispensing chamber ports therethrough;

a series of lubricant additive injectors assembled to the dispenser base assembly, each lubricant additive injector aligned to and in fluid communication with a respective dispensing chamber port, each lubricant additive injector having:

an outer tubular structure comprising a partially permeable membrane outer sidewall, an inner tubular structure comprising a vertical sidewall, the inner tubular structure located within a hollow region formed by the outer tubular structure, an additive cavity formed in the space created between the outer tubular structure and the inner tubular structure, and a delivery piston forming a seal across the additive cavity, the piston being on a plane that is oriented generally perpendicular to the additive cavity; and additive stored within the additive cavity;

wherein the delivery piston is positioned to transfer pressure from flowing lubricant to the stored additive, compressing the additive causing the additive to be dispensed through the partially permeable membrane outer sidewall.

While another aspect of the present invention provides at least one flow discharge port located through the outer tubular structure proximate a distal end.

Yet in another aspect, the series of lubricant additive injectors are spatially positioned forming a circular pattern about the base assembly.

Wherein another aspect, the series of lubricant additive injectors are spatially positioned forming a spiral pattern about the base assembly.

Another aspect integrates a lubricant distribution manifold within the dispenser base assembly.

In another aspect of the present invention, a central plug is inserted through a central plug aperture within the base assembly.

While another aspect, the lubricant additive injection system further comprising a cylindrical dispensing chamber having a porous outer sidewall, the chamber being filled with additive and a delivery piston providing a seal between the lubricant and the additive.

Yet another aspect, the porous material is micro-porous polymer membrane.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF REPRESENTATIVE EMBODIMENTS

Figure 1:
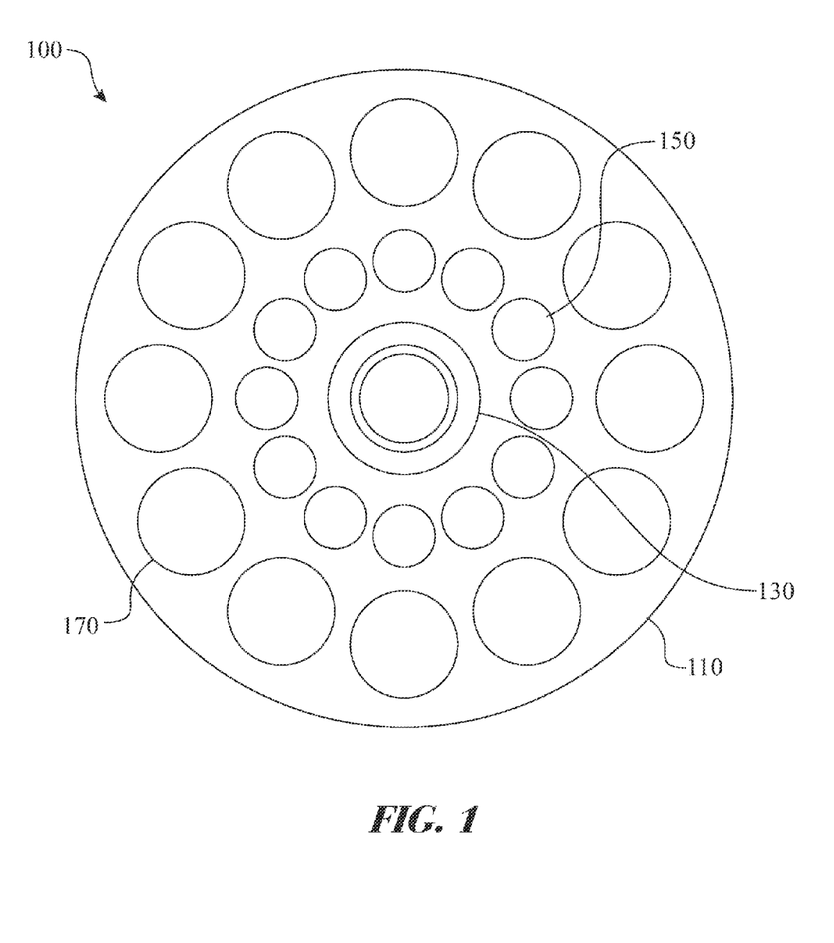
FIG. 1 presents an top plan view of an exemplary multi-chambered additive dispenser illustrating a first layout.
Figure 2:
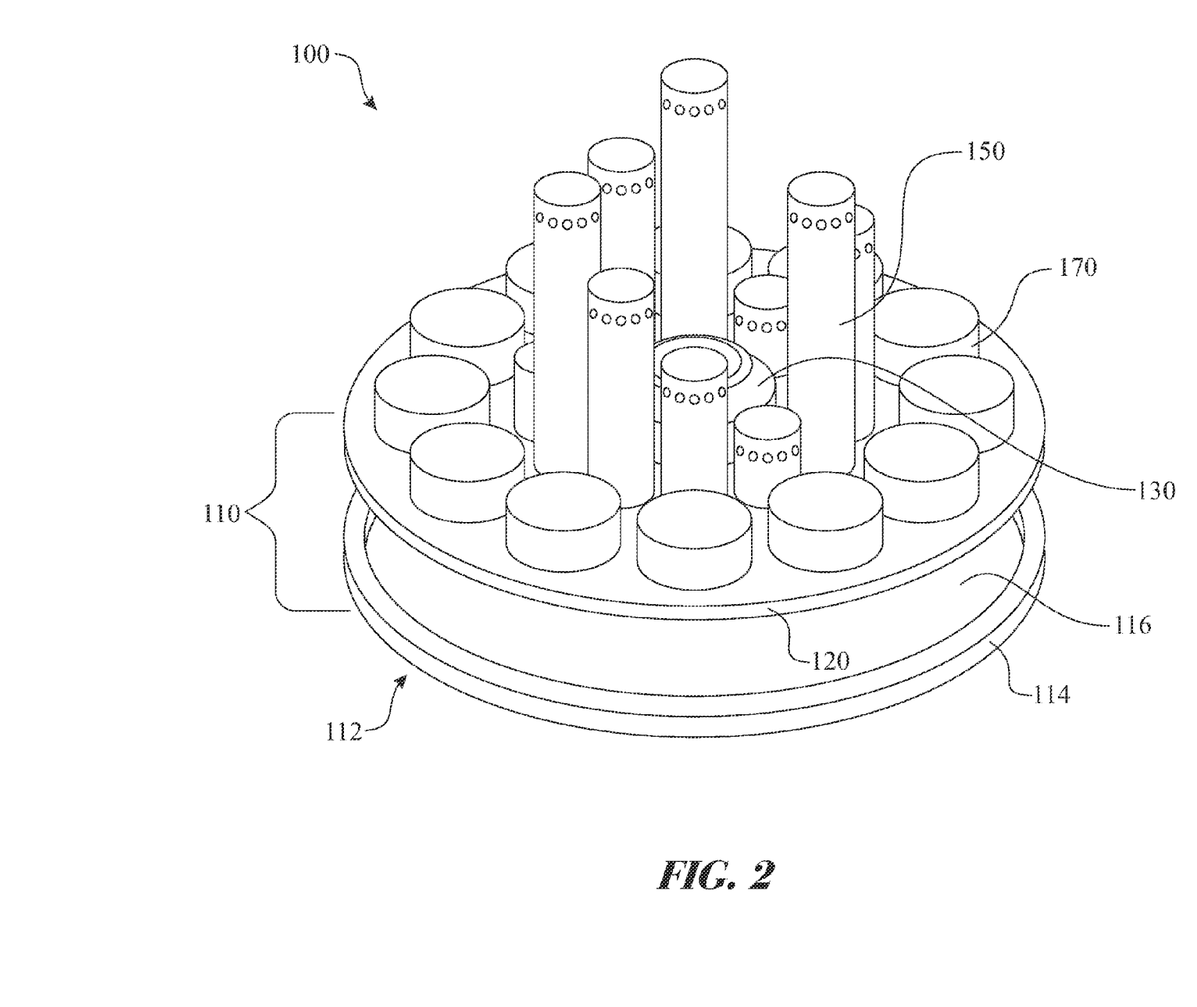
FIG. 2 presents a partially exploded isometric view of the exemplary multi-chambered additive dispenser of FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
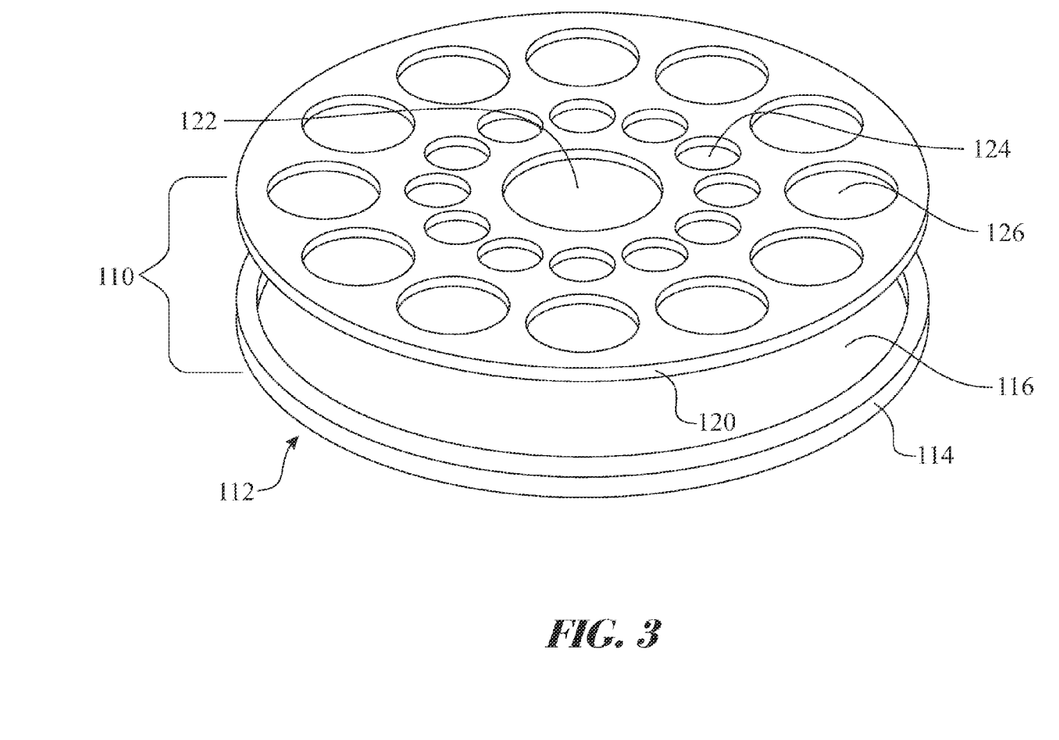
FIG. 3 presents an exploded isometric view of a dispenser base assembly providing a manifold for distributing lubricant to each of a series of dispensing elements.
Figure 4:
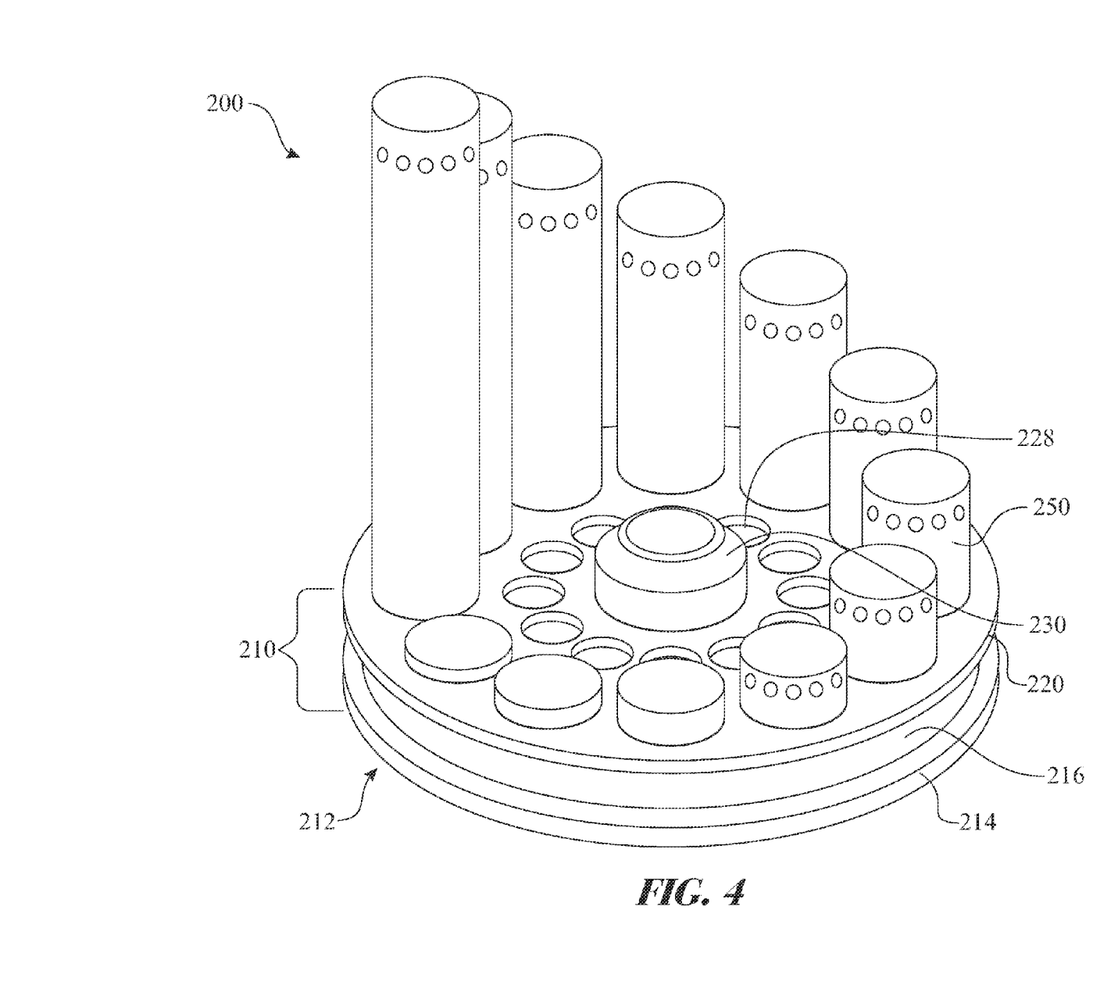
FIG. 4 presents a partially exploded isometric view of a second exemplary multi-chambered additive dispenser.
Figure 5:
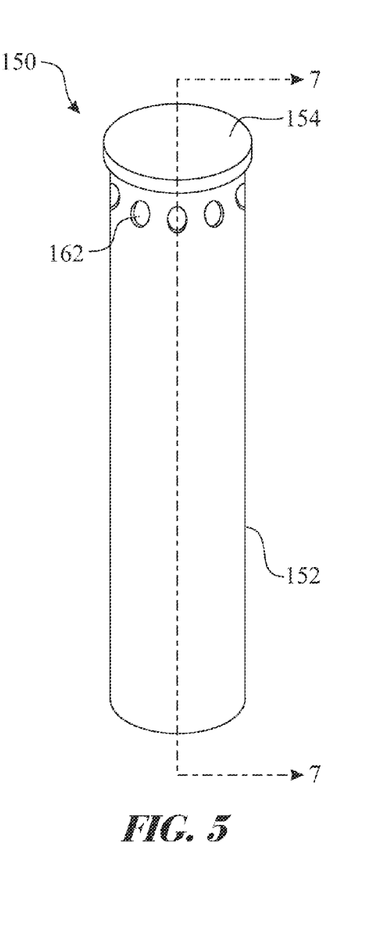
FIG. 5 presents an isometric view detailing an exemplary tubular dispensing chamber.

A multi-chambered additive dispenser 100 dispenses additive into a lubricant, the multi-chambered additive dispenser 100 being described in FIGS. 1 through 4, with details of the dispensing members being described in FIGS. 5 through 9. Lubricant enters a dispenser base assembly 110, which distributes the lubricant to a series of apertures provided therethrough. The dispenser base assembly 110 includes a hollow center referred to as a base manifold 116. The base manifold 116 is defined by a base peripheral wall 114 fabricated between a base of a base lower member 112 and a base upper member 120. The lubricant enters the base manifold 116 and passed into the series of dispensing chambers via a series of hollow dispensing chamber port 124 and/or solid dispensing chamber port 126. The ports 124, 126 can be provided in any arrangement, including circular arrays as illustrated in FIG. 3, spiraling, rectangular, random, and the like. A central plug aperture 122 can be provided through the base upper member 120 as an override as needed, wherein the central plug aperture 122 is preferably centrally located. The base lower member 112 can include a threaded (or other) attachment interface for engagement with a lubricant servicing system. The attachment interface provides mechanical coupling and fluid communication between the lubricant servicing system and the multi-chambered additive dispenser 100. The base upper member 120 can be planar as illustrated or of any shaped surface.

A series of additive delivery dispensers 150, 170 are assembled to the base upper member 120, each additive delivery dispenser 150, 170 is positioned respective to a port 124, 126. The additive delivery dispensers 150, 170 can be of similar heights, such as the solid dispensing chamber 170 illustrated in FIG. 2 or of a variety of heights such as the tubular dispensing chamber 150 illustrated in FIG. 2.

A central plug 130 is removably inserted into the central plug aperture 122 providing a seal. The central plug 130 can be removed to divert the lubricant from pressure against the series of additive delivery dispensers 150, 170. The central plug 130 can be of any reasonable design for sealing a port. It is understood that the central plug 130 can be a single unit or a provided as a plurality of plugs 130 and they can be positioned as desired.

The additive is stored within the series of additive delivery dispensers 150, 170, as illustrated in FIGS. 5 through 9. The additive delivery dispensers can be provided in a variety of configuration, such as a tubular dispensing chamber 150 and the solid dispensing chamber 170, based upon the designated application. The tubular dispensing chamber 150 is fabricated forming two sections: a reservoir for storing additive 158 and a passageway for conveyance of the lubricant. The reservoir is created by a porous sidewall 152 forming an external surface of the tubular dispensing chamber 150. The porous sidewall 152 is formed into a tubular shape, creating a hollow interior. A second, inner flow sidewall 164 is assembled within the hollow interior formed by the porous sidewall 152. The inner flow sidewall 164 can be porous or non-porous. The additive 158 is stored in a volume formed between the interior surface of the porous sidewall 152 and the exterior surface of the inner flow sidewall 164. The top of the volume may be sealed using either a porous or an impermeable cap. A delivery piston 156 is moveably provided along a lower portion of the reservoir holding the additive 158. The molecular structure of the additive 158 is such to remain contained within the reservoir until pressure is applied. The porous material is preferably of a micro-porous polymer, having a porosity that maintains the additive 158 therein until a pressure is applied. The applied pressure forces small amounts of the additive 158 through the porous material. The additive 158 then blends into the lubricant surrounding the tubular dispensing chamber 150. Where the inner flow sidewall 164 is also porous, the additive 158 also blends into the lubricant within the lubricant passage 160.

The tubular dispensing chamber 150 apportions the lubricant between a dispensing portion and a pass through portion. The dispensing portion applies a dispensing force 180 to a delivery piston 156. Applied pressure forces the additive 158 through the porous sidewall 152 in a small, controlled volume. The portion of the lubricant contacting the delivery piston 156 applies a pressure to the additive 158. The delivery piston 156 adjusts upwardly as the additive 158 is dispensed into the lubricant until the delivery piston 156 is seated against a distal end of the reservoir. The dispensed additive 158 blends into the lubricant. Upon depletion of the additive 158, the spent tubular dispensing chamber 150 can be removed and replaced with a new tubular dispensing chamber 150. The balance of the lubricant passes through a lubricant passage 160 formed within an interior of the inner flow sidewall 164, exiting through a flow discharge port 162 referenced as a pass through flow 182 illustrated in FIGS. 7 and 8. The designer can incorporate any reasonable flow control path for returning the lubricant back into the system, such as the exemplary embodiments illustrated in FIGS. 10 and 11. A directive end cap 154 provides an upper end of the tubular dispensing chamber 150. The tubular dispensing chamber 150 can be porous or impermeable. The flow discharge port 162 can be provided in any of a variety of form factors including a series of ports spatially arranged about the circumference of the porous sidewall 152. The tubular dispensing chamber 150 provides a flow path that minimizes any impact of sludge buildup within the multi-chambered additive dispenser 100. The continuous flow of lubricant and small cross sectional area of the delivery piston 156 minimizes any potential for collection of sludge.

Figure 6:
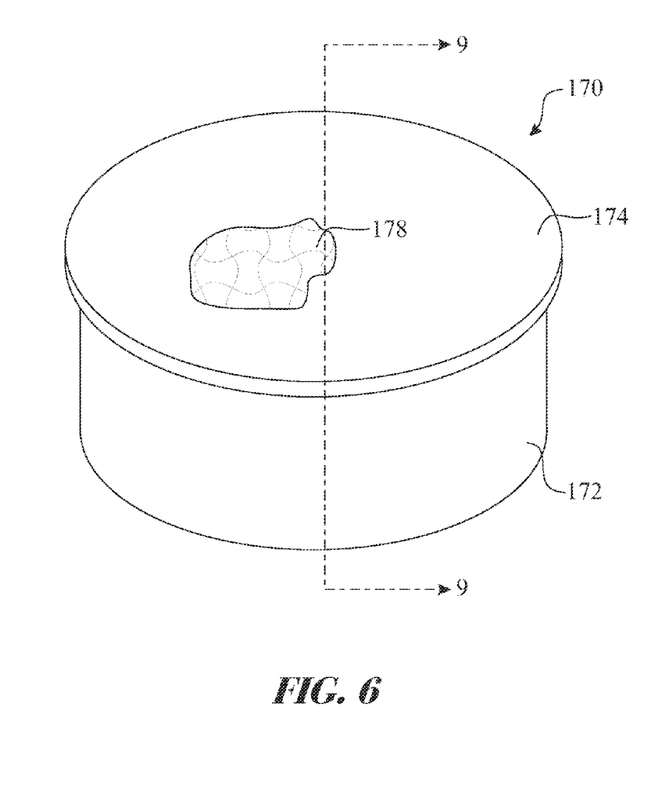
FIG. 6 presents an isometric view detailing an exemplary solid dispensing chamber.
Figure 7:
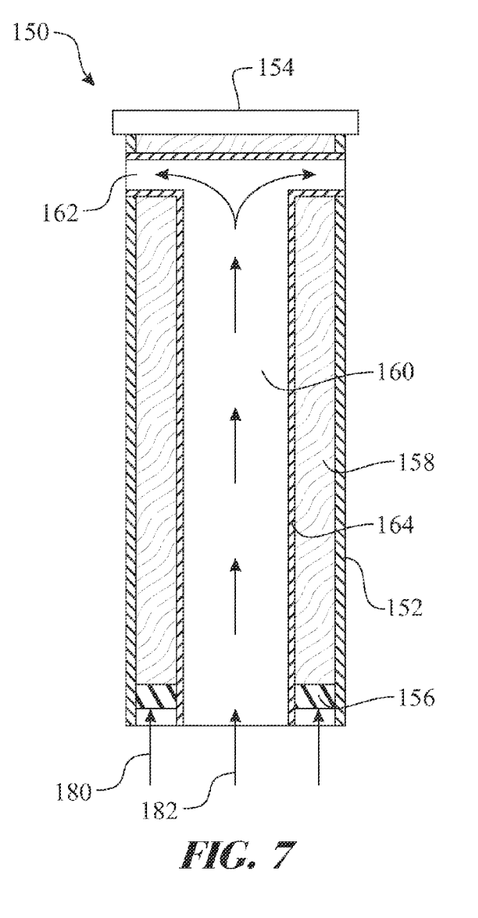
FIG. 7 presents a side-sectional view of the tubular dispensing chamber, the section taken along section 7-7 of FIG. 5, illustrated in a filled configuration.
Figure 8:
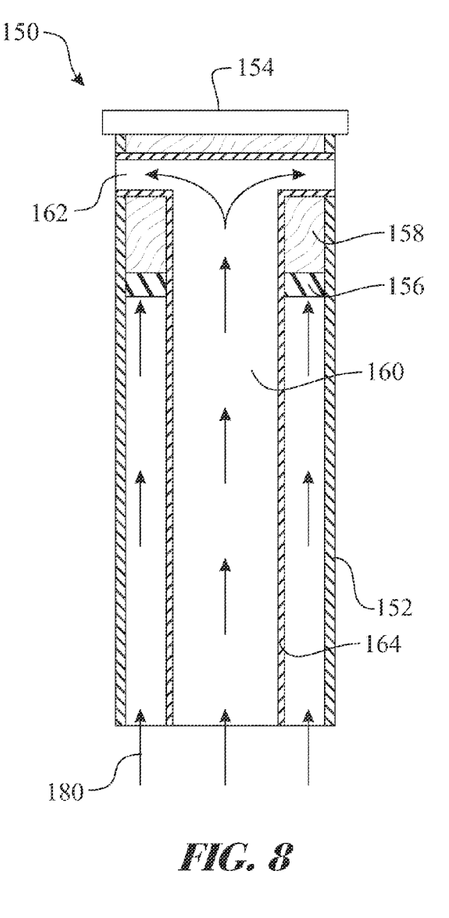
FIG. 8 presents a side-sectional view of the tubular dispensing chamber, the section taken along section 7-7 of FIG. 5, illustrated in a partially consumed configuration.
Figure 9:
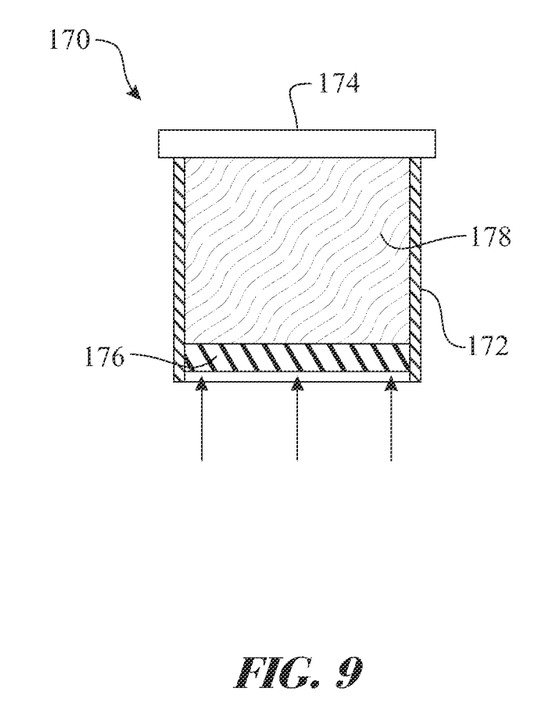
FIG. 9 presents a side-sectional view of the solid dispensing chamber, the section taken along section 9-9 of FIG. 6, illustrated in a filled configuration.

Alternately, a solid dispensing chamber 170 can be utilised. The solid dispensing chamber 170 is similar to the tubular dispensing chamber 150, void of a lubricant passage 160. The solid dispensing chamber 170 is formed having a porous sidewall 172 creating a reservoir for containment and dispensing of additive 178. A directive end cap 174 is disposed upon a distal end of the porous sidewall 172 provide a distal seal for the solid dispensing chamber 170. Similar to the tubular dispensing chamber 150, the lubricant applies a pressure to the delivery piston 176, forcing the additive 178 through the porous sidewall 172 in a controlled volume. The dispensed additive 178 blends into the lubricant.

The multi-chambered additive dispenser can arrange the dispensing chambers in a variety of configurations. The multi-chambered additive dispenser 100 of FIGS. 1 and 2 include a series of solid dispensing chambers 170 spatially arranged in a circular configuration. A series of tubular dispensing chambers 150 are spatially arranged in a circular configuration within the center of the circular boundary created by the series of solid dispensing chambers 170. The lubricant passes through the lubricant passage 160 to minimize flow loss. The solid dispensing chambers 170 are provided at a variety of heights to aid in fluid flow and overcome any sludge build up on a downstream flow side of the multi-chambered additive dispenser 100. The different heights also aid in mixing the additive 158 into the lubricant by dispensing the additive 158 at different levels.

It is understood that the additive delivery dispensers 150, 170 can be arranged in any relationship. A second exemplary embodiment is referred to as a spiraling multi-chambered additive dispenser 200 and illustrated in FIG. 4. Lubricant enters a dispenser base assembly 210, which distributes the lubricant to a series of apertures provided therethrough. The dispenser base assembly 210 includes a hollow center referred to as a base manifold 216. The base manifold 216 is defined by a base peripheral wall 214 fabricated between a base of a base lower member 212 and a base upper member 220. The lubricant enters the base manifold 216 and passed into the series of dispensing chambers via a series of ports similar to the solid dispensing chamber port 126. A series of dispensing chambers 250 are provided in a circular pattern having a spiraling height as illustrated. It is understood the dispensing chambers 250 can be arranged in a horizontal spiraling pattern as well. A series of lubricant passage ports 228 are provided through the base upper member 220, allowing lubricant to pass through base upper member 220 and return to the lubrication system. A central plug 230 can be provided, wherein the central plug 230 can be adjustable for adjustably controlling the free flow of the lubricant through the spiraling multi-chambered additive dispenser 200.

The multi-chambered additive dispenser 100 can be encased within a housing, similar to an oil filter or inserted into a conduit used for the passage of lubricant. The multi-chambered additive dispenser 100 can be combined with a lubricant filter via any reasonable means such as either of the exemplary embodiments presented in FIGS. 10 and 11.

Figure 10:
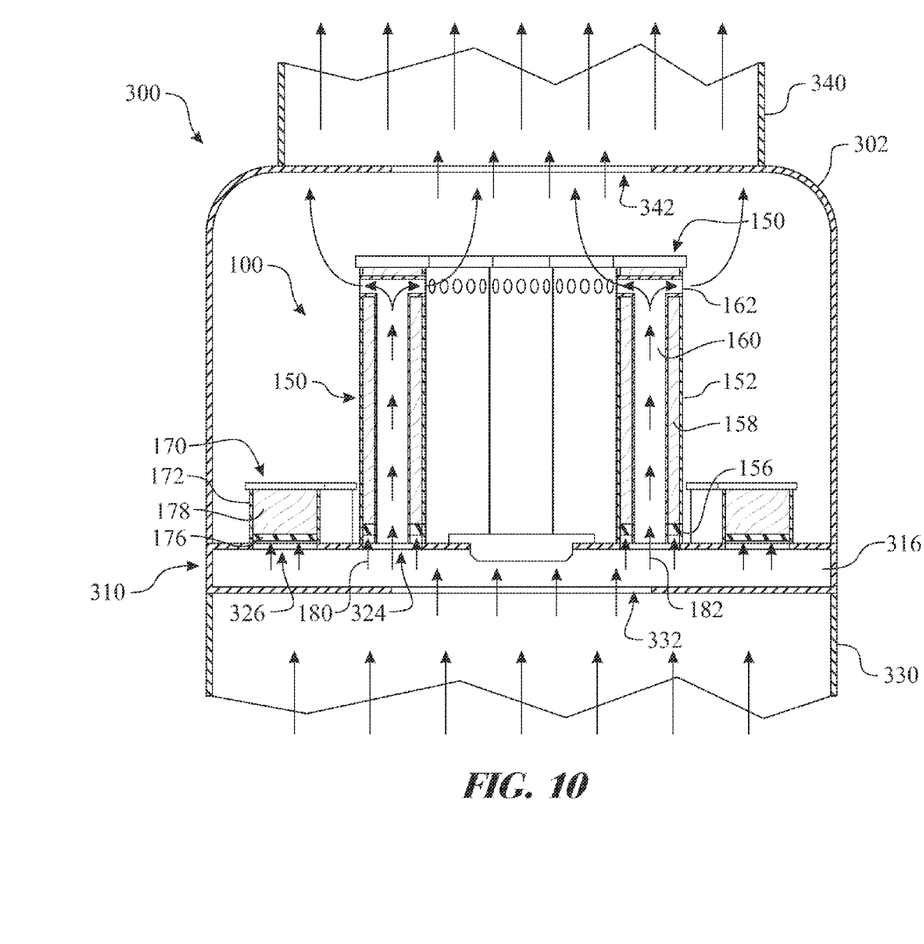
FIG. 10 presents a side sectional view of the multi-chambered additive dispenser encased within a linear pass through delivery apparatus.

The multi-chambered additive dispenser 100 can be integrated within a linear, pass through additive dispenser 300 as illustrated in FIG. 10. The linear, pass through additive dispenser 300 is positioned in a serial, linear flow path, positioned between a lubricant source pipe 330 and a lubricant return pipe 340. Lubricant flows into the linear, pass through additive dispenser 300 via the lubricant source pipe 330. The lubricant passes into a base manifold 316 via a lubricant source passageway 332. The lubricant source pipe 330 can be coupled to the dispenser base assembly 310 in any reasonable manner; preferably a configuration allowing ease of servicing of the linear, pass through additive dispenser 300. It is understood the lubricant source passageway 332 can be of any size and shape. The lubricant is distributed within the base manifold 316 to a plurality of hollow dispensing chamber ports 324 and a plurality of solid dispensing chamber ports 326. The lubricant applies pressure to the delivery piston 156 and delivery piston 176. The delivery piston 156 and additive 178 transfer the pressure to the additive 158 and additive 178 respectively, causing the additive 158, 178 to discharge through the porous sidewall 152, 172. The lubricant also passes through the hollow dispensing chamber port 324, continuing through the lubricant passage 160 and discharging via the flow discharge port 162 into the interior formed by a dispenser enclosure 302. The treated lubricant can exit the dispenser enclosure 302 through a lubricant return passageway 342, passing into the lubricant return pipe 340. The lubricant return pipe 340 conveys the treated lubricant back into a lubrication system.

Figure 11:
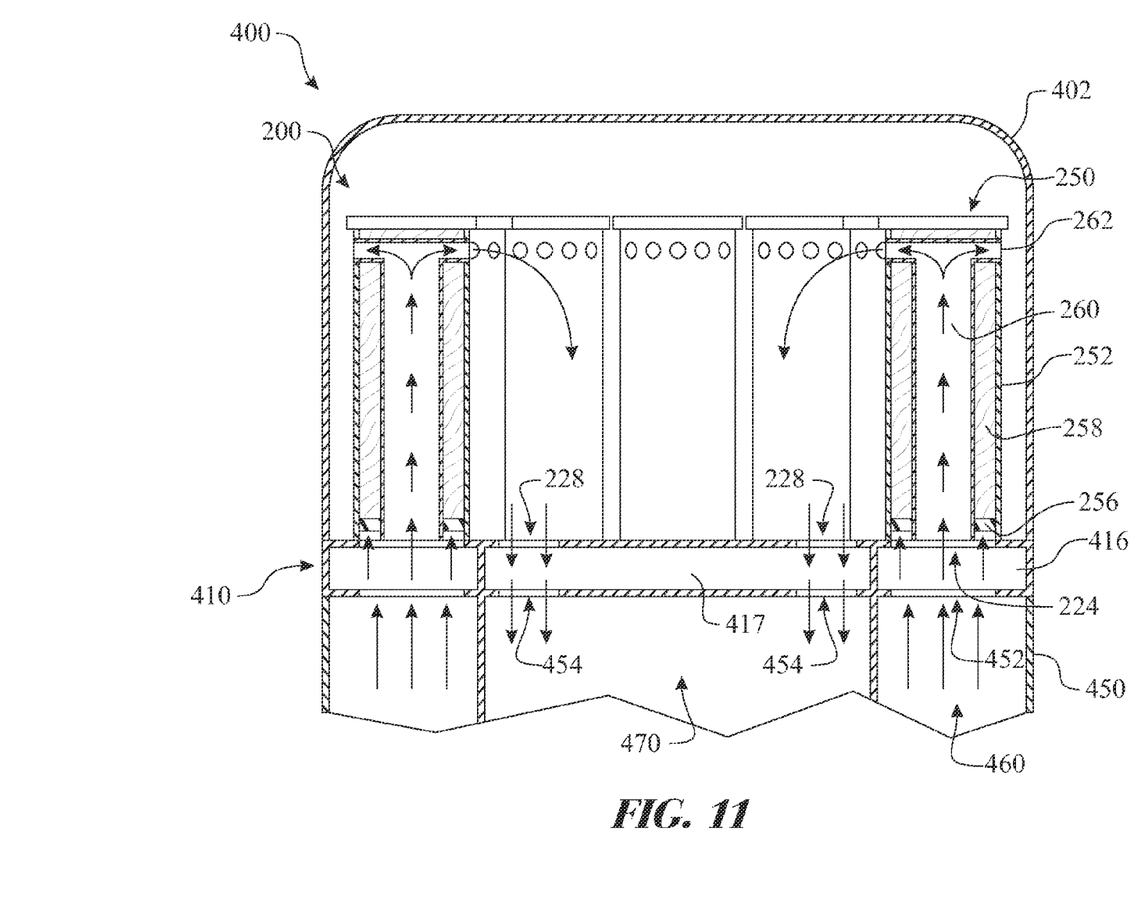
FIG. 11 presents a side sectional view of the multi-chambered additive dispenser encased within a "U"-shaped pass through delivery apparatus.

The spiraling multi-chambered additive dispenser 200 (as shown), or similar, can be integrated within a bracket mounted additive dispenser 400 as illustrated in FIG. 11. The bracket mounted additive dispenser 400 is adapted to mount to a bracket 450. Lubricant flows into the bracket mounted additive dispenser 400 via the lubricant supply path 460 formed within the bracket assembly 450. The lubricant passes into a supply manifold 416 via a bracket supply port 452. The bracket assembly 450 can be coupled to the dispenser base assembly 410 in any reasonable manner; preferably a configuration allowing ease of servicing of the bracket mounted additive dispenser 400. It is understood the bracket supply port 452 can be of any size and shape. The lubricant is distributed within the supply manifold 416 to a plurality of hollow dispensing chamber ports 224. The lubricant applies pressure to the delivery piston 256. The delivery piston 256 transfers the pressure to the additive 258, causing the additive 258 to discharge through the porous sidewall 252. The lubricant also passes through the hollow dispensing chamber port 224, continuing through the lubricant passage 260 and discharging via the flow discharge port 262 into the interior formed by a dispenser enclosure 402. The treated lubricant can exit the dispenser enclosure 402 through a plurality of lubricant passage ports 228, passing into a discharge manifold 417. The treated lubricant continues through at least one bracket discharge port 454, into a lubricant return path 470 to return to the lubrication system. This flow creates turbulence as the lubricant exits the flow discharge port 262 and flows back across the porous sidewall 252. The discharged additive 258 mixes with the lubricant as it passes across the porous sidewall 252.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. A lubricant additive dispenser, the dispenser comprising:
a lubricant distribution manifold comprising a series of dispensing chamber ports;
a series of dispensing chambers each comprising an additive reservoir defined by a porous sidewall arranged forming a tubular shape, an end cap disposed upon a distal end of the tubular porous sidewall and a delivery piston moveably provided within an interior created by the tubular porous sidewall;
a volume of additive disposed within the additive reservoir;
the series of dispensing chambers assembled to the lubricant distribution manifold, aligning each dispensing chamber with a respective dispensing chamber port,
wherein lubricant applies a pressure to the delivery pistons and the delivery pistons force a volume of additive through the porous sidewall of the respective chamber.

2. A lubricant additive dispenser as recited in claim 1, a first dispensing chamber has a different height than a second dispensing chamber in the series of dispensing chambers.

3. A lubricant additive dispenser as recited in claim 1, at least a portion of the dispensing chambers further comprising an inner flow sidewall forming a tubular shape, the inner flow sidewall assembled within an interior section formed by the tubular porous sidewall,
the additive reservoir being further defined as being between an exterior surface of the inner flow sidewall and the interior surface of the porous sidewall; and
an interior surface of the inner flow sidewall forming a lubricant passage therethrough.

4. A lubricant additive dispenser as recited in claim 3, the dispensing chambers further comprising at least one flow discharge port providing fluid communication between the lubricant passage within the interior of the inner flow sidewall, through the porous sidewall and to a location external to the dispensing chamber.

5. A lubricant additive dispenser as recited in claim 4, wherein the at least one flow discharge port is located proximate the end cap.

6. A lubricant additive dispenser as recited in claim 5, a first dispensing chamber has a different height than a second dispensing chamber in the series of dispensing chambers.

7. A lubricant additive dispenser as recited in claim 1, wherein the end cap is fabricated of a porous material.

8. A lubricant additive dispenser, the dispenser comprising:
a lubricant distribution manifold comprising a series of dispensing chamber ports;
a first series of dispensing chambers each comprising an additive reservoir defined by a porous sidewall arranged forming a tubular shape, an end cap disposed upon a distal end of the tubular porous sidewall and a delivery piston moveably provided within an interior created by the tubular porous sidewall;
a volume of additive disposed within the additive reservoir;
the first series of dispensing chambers assembled to the lubricant distribution manifold, aligning each dispensing chamber with a respective dispensing chamber port;
a second series of dispensing chambers each comprising a tubular additive reservoir formed between an outer tubular sidewall and an inner tubular sidewall arranged within a hollow interior formed by the outer tubular sidewall, an end cap disposed upon a distal end of the tubular additive reservoir and a washer shaped delivery piston moveably provided within the area formed between the outer tubular sidewall and the inner tubular sidewall;
a volume of additive disposed within the tubular additive reservoir;
the second series of dispensing chambers assembled to the lubricant distribution manifold, aligning each dispensing chamber with a respective dispensing chamber port;
wherein lubricant applies a pressure to the delivery pistons and the delivery pistons force a volume of additive through the porous sidewall of the respective chamber.

9. A lubricant additive dispenser as recited in claim 8, a first dispensing chamber has a different height than a second dispensing chamber in at least one of the series of dispensing chambers.

10. A lubricant additive dispenser as recited in claim 8, wherein the heights of the dispensing chambers of at least one of the series of dispensing chambers vary providing at least three different heights.

11. A lubricant additive dispenser as recited in claim 8, the dispensing chambers being removable attached to the lubricant distribution manifold, allowing replacement of the dispensing chambers upon depletion of the additive.

12. A lubricant additive dispenser as recited in claim 8, the dispensing chambers further comprising a lubricant passage provided within a hollow interior formed by the inner tubular sidewall, the lubricant passage in fluid communication with the lubricant distribution manifold.

13. A lubricant additive dispenser as recited in claim 12, the dispensing chambers further comprising at least one flow discharge port providing fluid communication between the lubricant passage within the interior of the inner flow sidewall, through the porous sidewall and to a location external to the dispensing chamber.

14. A lubricant additive dispenser as recited in claim 13, wherein the at least one flow discharge port is located proximate the end cap.

15. A lubricant additive dispenser as recited in claim 8, wherein the end cap is fabricated of a porous material.

16. A lubricant additive dispenser, the dispenser comprising:
a lubricant distribution manifold comprising a series of dispensing chamber ports and at least one lubricant transfer port;
a series of dispensing chambers each comprising an additive reservoir defined by a porous sidewall arranged forming a tubular shape, an end cap disposed upon a distal end of the tubular porous sidewall and a delivery piston moveably provided within an interior created by the tubular porous sidewall;
a volume of additive disposed within the additive reservoir;
the series of dispensing chambers assembled to the lubricant distribution manifold, aligning each dispensing chamber with a respective dispensing chamber port,
wherein lubricant applies a pressure to the delivery pistons and the delivery pistons force a volume of additive through the porous sidewall of the respective chamber, and
wherein the at least one lubricant transfer port provides a fluid passage through the manifold external to the dispensing chambers.

17. A lubricant additive dispenser as recited in claim 16, at least a portion of the dispensing chambers further comprising an inner flow sidewall forming a tubular shape, the inner flow sidewall assembled within an interior section formed by the tubular porous sidewall, the additive reservoir being further defined as being between an exterior surface of the inner flow sidewall and the interior surface of the porous sidewall; and an interior surface of the inner flow sidewall forming a lubricant passage therethrough.

18. A lubricant additive dispenser as recited in claim 17, the dispensing chambers further comprising at least one flow discharge port providing fluid communication between the lubricant passage within the interior of the inner flow sidewall, through the porous sidewall and to a location external to the dispensing chamber.

19. A lubricant additive dispenser as recited in claim 18, wherein the at least one flow discharge port is located proximate the end cap.

20. A lubricant additive dispenser as recited in claim 16, wherein the end cap is fabricated of a porous material.

* * * * *